United States Patent
Gauggel et al.

[11] Patent Number: 6,007,020
[45] Date of Patent: Dec. 28, 1999

[54] MISSILE FOR DETECTING AND COMBATTING ENEMY HELICOPTERS

[75] Inventors: Roland Gauggel, Salem; Reinhard Krüger, Rückstetten bei Teisendorf, both of Germany

[73] Assignee: LFK Lenkflugkoerpersysteme GmbH, Munich, Germany

[21] Appl. No.: 08/811,290

[22] Filed: Mar. 4, 1997

[51] Int. Cl.$^6$ .................. F41G 7/00; G01J 5/02
[52] U.S. Cl. .......................... 244/3.16; 250/342
[58] Field of Search .............. 250/342; 244/3.16, 244/3.17

[56] References Cited

U.S. PATENT DOCUMENTS

| | | | |
|---|---|---|---|
| 3,837,733 | 9/1974 | Shoch et al. | 244/3.17 |
| 4,106,726 | 8/1978 | Emmons et al. | 244/3.17 |
| 4,342,032 | 7/1982 | Roesch et al. | 250/342 |
| 4,389,647 | 6/1983 | Fanuele et al. | 342/192 |
| 4,630,051 | 12/1986 | Adams et al. | 342/133 |
| 4,842,247 | 6/1989 | Kurbitz et al. | 250/342 |
| 4,952,809 | 8/1990 | McEwen | 250/342 |
| 5,341,435 | 8/1994 | Corbett et al. | 382/1 |
| 5,400,134 | 3/1995 | Obkircher | 250/342 |
| 5,529,261 | 6/1996 | Iddan | 244/3.16 |
| 5,826,820 | 10/1998 | Dubois et al. | 244/3.16 |

FOREIGN PATENT DOCUMENTS

| | | |
|---|---|---|
| 33 26 233 | 12/1985 | Germany. |
| 195 05 791 | 8/1996 | Germany. |

*Primary Examiner*—Theresa M. Wesson
*Attorney, Agent, or Firm*—Hill & Simpson

[57] ABSTRACT

A missile for detecting and combatting enemy helicopters has an infrared homing head with an infrared lens and infrared sensor that will emit electrical signals, depending on incident infrared radiation, and the sensor is designed as a two-dimensional detector matrix consisting of a number of punctiform detector cells arranged essentially in the focal plane of the infrared lens. The homing head includes an arrangement for acquiring a target and determining the type of target from the target information by individually scanning each of the detector cells quickly one after another by evaluating the amplitude and frequency of the electrical signals. The determination includes determining the relative position of the target to the optical axis of the homing head and the homing head will then steer the missile to hit the target. To improve the target acquisition and recognition phase, the matrix detector can be periodically swung around the axis of the flight path of the missile and, after target pick-up, is stabilized to lock on any helicopter to initiate and carry out the target-type recognition.

8 Claims, 1 Drawing Sheet

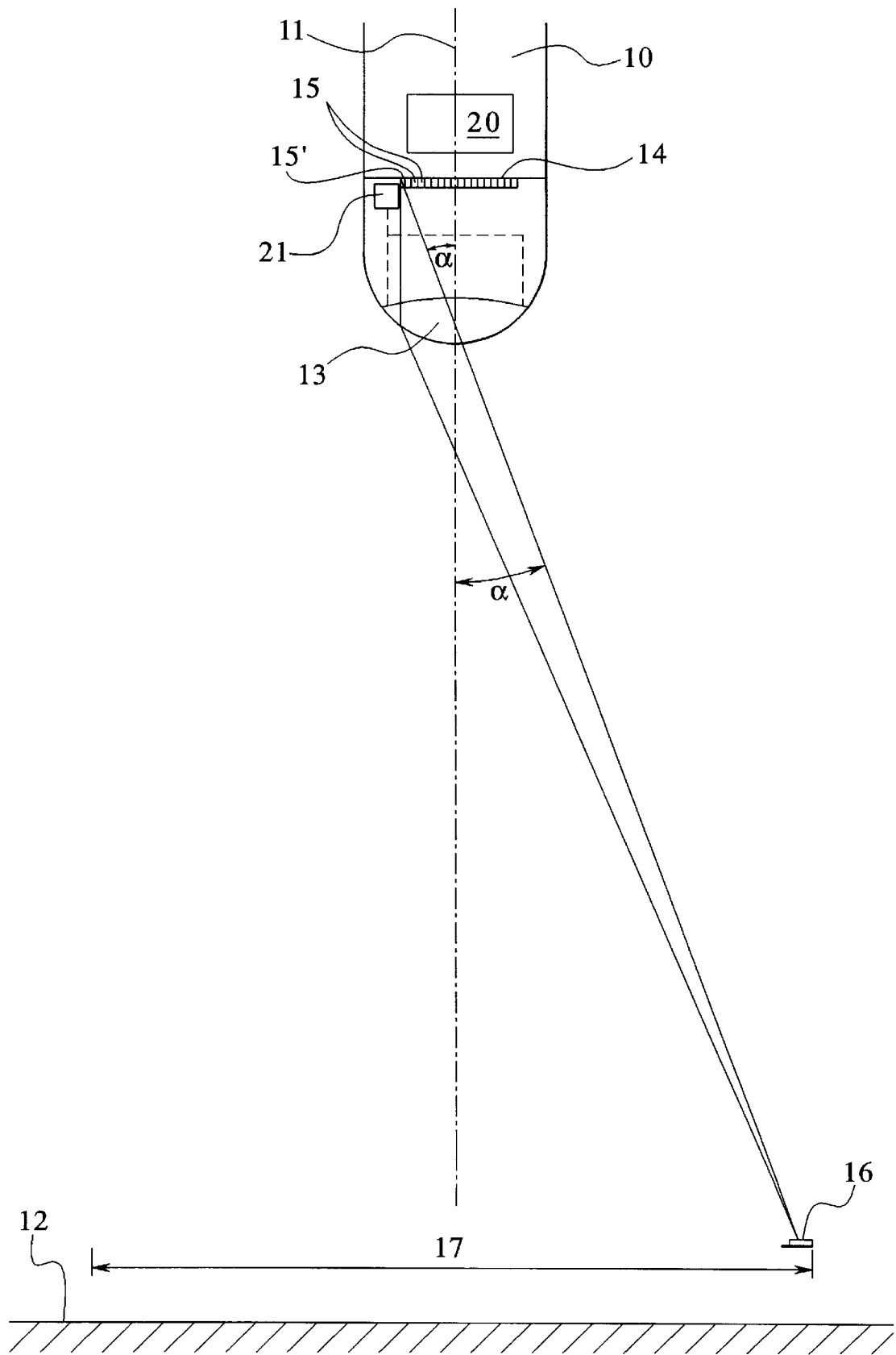

MISSILE FOR DETECTING AND COMBATTING ENEMY HELICOPTERS

BACKGROUND OF THE INVENTION

The present invention is directed to a method for detecting and combatting enemy helicopters by means of a missile that has an infrared homing head with an infrared lens and an infrared sensor that will emit electrical signals, depending on the incident of infrared radiation, which sensor is designed as a two-dimensional detector matrix consisting of a number of punctiform detector cells arranged essentially in the focal plane of the infrared lens. To determine the target information of a detected helicopter, the punctiform detector cells are individually scanned quickly one after another by an evaluation device to determine the amplitude and the frequency of the electrical signals, so that nearly a simultaneous transmission of all measured values will take place so that the homing head flying over the helicopter will pick up the infrared radiation released upward by the helicopter's propulsion turbine and exhaust gas plume and modulated by the helicopter rotor blades to determine the helicopter's relative position on the optical axis of the homing head, and after completion of the target recognition carried out by a time series analysis of the modulated infrared radiation of the helicopter, steers a missile equipped with an active charge until it hits the target.

A method is known from U.S. Pat. No. 5,400,134, whose disclosure is incorporated herein by reference thereto and which claims priority from German Patent Application 37 33 681. This method uses a missile which has a matrix detector, which is firmly connected with the missile, and the optical axis of the matrix extends parallel to the missile's longitudinal axis. A large field of view required to combat targets operating in a concealed manner, which can only be reconnoitered with corresponding inaccuracy, is achieved by use of a wide-angle lens with relatively low resolution. The infrared radiation typical of the target, which radiation is modulated by the operation of the helicopter's rotors, is used as a characteristic feature for target-type recognition.

This known method has thoroughly proven itself. However, the procedure comes up against certain limits, particularly when the speed of the missile serving as a homing head carrier and, thus, also of the matrix detector, exceeds certain values. In this case, if the modulation amplitude of the target, for example the helicopter to be detected, is also small, as is the case, for example, when camouflaging measures are provided on the helicopter, and if the contrast range of the background is also high, the target recognition and target-type recognition are much less likely to be achieved.

On the other hand, it is already known to use an infrared-sensitive homing head for which a matrix detector operated with high resolution is swung by means of a gimbal and in this way, in connection with level motion of the missile, scans the field of view for the targets. With this method, target acquisition and target-type recognition are carried out with methods of image processing, for example, individual images are examined on the basis of overall contrast range, distribution of the contrast and gradients, among other things. This method, in turn, has its limits when the line of sight between the missile and the helicopter to be detected becomes too long and/or different helicopters display similar geometric features. In this case, the image-processing homing head is indeed still able to recognize helicopters as such, but the likelihood of successful target-type recognition is clearly reduced.

It is already known from German Patent Application 33 26 233 to make a distinction by means of a target homing head, between a target-seeking phase, in which the entire field of view is scanned, and an approach phase, in which only the immediate surroundings of the target point are scanned, and to switch the scanning motion accordingly. In so doing, it is necessary to execute the target-type recognition already in the target-seeking phase.

SUMMARY OF THE INVENTION

The present invention is based on a technical problem of improving the method mentioned above in such a way that at high missile speeds, even camouflaged targets can still be perfectly picked up and identified according to target type.

According to the invention, the technical problem is solved in a target-seeking phase to scan the target area, the matrix detector is periodically swung back and forth relative to an axis situated parallel to the flight direction of the missile, and that after target pick-up, to initiate a target-type recognition phase, during which the matrix detector is stopped and stabilized on the picked-up target so that in the target-type recognition phase, with unchanged continuing flight and maintaining a trajectory of the missile, the target picked up is subjected to a time series analysis for target-type recognition and that if, based on recognition of the modulated infrared radiation of the detected target as a flying object to be steered toward in target approach, the time series analysis ends the target-type recognition phase, the final approach is initiated and the missile is steered by an image-processing homing head until it hits the target.

In this connection, it can be provided for to use a matrix detector in which the detector cells are made of CdHgTe or InSb or, similarly, infrared-sensitive material, and all are sensitive in the same wavelength range of 3 $\mu$m to 15 $\mu$m or a part of this particular range.

In this connection, the invention also proposes, if need be, to use an infrared lens with a variable maximum lateral angle to modify the field of view in a controlled manner.

According to the invention, one can proceed in such a way that the periodic swinging of the matrix detector, essentially in level flight of the missile, is caused by use of a gimbal.

The invention is also based on the surprising realization that even with high-speed missiles, perfect target pick-up and reliable target-type recognition can be guaranteed in that the matrix detector, which is rigidly connected with the missile in the prior state of the art, is swung quickly back and forth in a target-seeking phase, so that a wide-angle scanning of the field of view is possible. As soon as a helicopter is recognized as such in this way, the matrix detector is stabilized on the target opposite the missile, whereupon the target-type recognition according to the above-mentioned U.S. Patent then takes place.

In the invention, the shortcomings inherent in certain cases of application in the two recognition concepts discussed in the beginning are avoided. In this connection, the basic electromechanical design of the image-processing homing head, as it is provided for in the proposed scanning method, is maintained. Unlike the prior state of the art, in which a target-type recognition by checking the helicopter's radiation for modulation is already provided for, the target area is, first, scanned to detect and pick up a target by swinging the matrix detector during level motion of the missile. When a target is picked up, the detector is stopped and stabilized on the target, whereby the missile maintains its trajectory. By means of the detector stabilized on the target, during further flight of the missile, the target-type recognition is carried out by a time series analysis of the modulated infrared radiation of the helicopter. After the target-type check is completed, the final approach is initiated and the missile is steered by the image-processing homing head until it hits the target.

In the invention, the target-type recognition is thus carried out under the optimal boundary conditions for modulation recognition, that of a mechanically stabilized sensor. The computer capacity requirements necessary for modulation recognition are quite minor compared to the prior state of the art, because only a small vicinity around the target helicopter recognized beforehand by the image processing has to be examined for modulations. Consequently, that portion of the image processing which, with the known scanning method, does not meet the target-type recognition requirements in certain cases of application, is replaced by a target-type recognition, very rugged under ideal conditions, by time series analysis according to the pertinent state of the art, so that, in this instance, the ideal conditions are replaced by actual conditions that come as close as possible to the ideal conditions, namely they are using a stabilized detector in the target-type determination.

Other advantages and features of the invention will be readily apparent from the following description of the preferred embodiment, the drawings and claims.

BRIEF DESCRIPTION OF THE DRAWINGS

The FIGURE is a diagrammatic illustration of an execution of the method, as seen parallel to the ground level.

DESCRIPTION OF THE PREFERRED EMBODIMENTS

The principles of the present invention are particularly useful when incorporated in a homing head 10, of which only a front or active part is illustrated. The homing head 10 has an optical axis 11 and is equipped at its tip with an infrared lens 13, illustrated as a convex lens in the drawing for the sake of simplicity. In practice, of course, a complex lens is used and is preferably a lens consisting of adjustable mirrors, whereby filters, diaphragms and the like can be added. The complex lens can have means 21 for modifying the field of view of the infrared lens to provide a variable maximum lateral angle. A matrix 14 of a number of punctiform detector cells 15 is arranged in the focal plane of the lens. These detector cells 15, usually called pixels, will pick up a predetermined wave range, namely an infrared radiation between 3 $\mu$m and 14 $\mu$m. In practice, the matrix 14 can be a square matrix of 16,000 pixels, for example. The pixels preferably consist of CdHgTe or of InSb, with a detection capacity $D^*\sim(10^{10}$ to $10^{11})$cm $W^{-1}Hz^{1/2}$ or a material of a similar infrared sensitivity. The electrical output signals of the individual pixels are fed to an evaluation device, which is not shown in the drawings, wherein the evaluation device scans the pixels almost simultaneously and/or picks up their output signals simultaneously but separately. The evaluation by the evaluation device then supplies an exact location of the infrared radiation source, on the one hand, and, on the other hand, the precise frequency of the radiation modulation, if it exists.

In the drawing, the homing head 10 is aimed from above at the ground 12 hinted at, whereby 16 designates an infrared radiation source, namely a helicopter, which is situated within a field of view 17 of the homing head 10. In this connection, the helicopter 16 is in the area of the edge of the field of view 17 and is, therefore, depicted also including in its background radiation onto the corresponding pixel at the edge of the matrix 14, whereby the radiation striking the pixel 15' is greater than the radiation striking the adjacent pixels 15. The evaluation device measures the radiation on all pixels struck by an increased radiation, namely until an eventually existing modulation in the frequency range of approximately 10 Hz to 30 Hz, which is characteristic for a helicopter, can be recognized. If such a modulation frequency is recognized, then it is possible to determine the type of helicopter, based on the exact determined frequency, because, within certain limits, helicopters fly with relatively constant rotor rotational speeds, in such a way that the determined modulation frequency determines the type of helicopter, making the helicopter type recognition possible. The position of the pixels on which the infrared modulation was ascertained provides the target information, for example the relative position of the target helicopter 16 from the optical axis 11.

According to the invention, the matrix 14, including the infrared lens, also referred to as matrix detector in the following, is designed in such a way that, during the initial phase in which a target is to be acquired, the matrix and lens are quickly swung back and forth relative to the axis 11 by a gimbal arrangement 20. Thus, the matrix 14 with the lens 13 is swung back and forth relative to the axis situated in the longitudinal direction of the missile carrying the homing head, whereby the field of view can be scanned. As soon as the visual contact is made with the helicopter 16, the matrix detector is stopped and stabilized to lock on the helicopter 16, whereupon the above-described target recognition takes place. The target recognition takes place by a series analysis of the infrared radiation modulated by the rotor blades of the helicopter. After completion of the target-type recognition, the homing head takes control of the missile equipped with a corresponding active charge until it hits the target formed by the helicopter 16.

Although various minor modifications may be suggested by those versed in the art, it should be understood that we wish to embody within the scope of the patent granted hereon all such modifications as reasonably and properly come within the scope of our contribution to the art.

We claim:

1. In a method for detecting and combatting an enemy helicopter by means of a missile that has an infrared homing head with an infrared lens and an infrared sensor in the form of a two-dimensional matrix detector consisting of a number of punctiform detector cells arranged essentially in the focal plane of the infrared lens, said method including performing a target acquisition phase, wherein target information of a helicopter is obtained by individually scanning each of the punctiform detector cells quickly one after the other by an evaluation device, determining the amplitude and frequency of electrical signals, and transferring the measured values simultaneously, wherein the infrared radiation from a propulsion turbine and exhaust gas plume of the helicopter, which radiation was modulated by the helicopter's blades, is picked up by the homing head, then performing a recognition phase to determine the type of helicopter in the target by a time series analysis of the modulated infrared radiation of the helicopter, determining the position of the helicopter relative to the optical axis of the homing head and steering the missile equipped with an active charge until it hits the target, the improvements comprising, during the target acquisition phase, scanning the target area by the matrix detector being periodically swung back and forth relative to the axis situated parallel to the flight direction of the missile, acquiring the target, initiating a target-type recognition phase by locking the matrix detector in a stopped stabilized position on the acquired target, so that during the target-type recognition phase with unchanged continued flight and maintaining the trajectory of the missile, the acquired target is subjected to a time series analysis for the target-type recognition and if, based on recognition of the modulated infrared radiation of the detected target as a flying object to be headed for in a target approach, the time series analysis ends the target-type recognition phase, and the final approach is initiated and the missile is steered by the homing head until it hits the target.

2. In a method according to claim 1, wherein a matrix detector is used in which the detector cells are made of a material selected from a group consisting of CdHgTe and InSb and all Cells are sensitive in the same wavelength range of 3 $\mu$m to 15 $\mu$m.

3. In a method according to claim 1, which includes modifying the field of view in a controlled manner by utilizing an infrared lens with a variable maximum lateral angle.

4. In a method according to claim 1, wherein the periodic swinging of the matrix detector essentially during a level flight of the missile is caused by use of a gimbal.

5. In an infrared search head for a missile, which head is designed to locate and engage enemy helicopters from above by detecting modulated infrared radiation given off by the helicopter and determining an offset angle of the helicopter with respect to an optical axis of the head, said search head including an infrared optical unit having an optical axis, an infrared sensing means having an infrared lens and infrared sensor consisting of a two-dimensional matrix detector having a large number of punctiform detector cells arranged essentially in a focal plane of the infrared lens, evaluation means for determining the amplitude and frequency of electrical signals of each of the detector cells and for analyzing the information determined from the modulation of the infrared radiation to determine the type of helicopter, the improvement comprising means for swinging the detector and infrared lens back and forth relative to an axis situated parallel to a flight direction for the missile during a target-acquisition phase, said means stopping the swinging and locking the lens and detector on an acquired target during a target recognition phase.

6. An infrared search head according to claim 5, wherein the detector cells of the matrix detector consist of a material selected from a group consisting of CdHgTe and InSb, and all cells having a sensitivity in the same wavelength range of 3 $\mu$m to 15 $\mu$m.

7. An infrared search head according to claim 5, wherein the infrared lens has a variable maximum lateral angle and the head includes means for modifying the field of view of the infrared lens.

8. An infrared search head according to claim 5, wherein the means for periodically swinging the detector matrix on the axis parallel to the flight of the missile includes a gimbal.

* * * * *